United States Patent [19]
Adler et al.

[11] 3,961,209
[45] June 1, 1976

[54] OSCILLATOR FOR TIME MEASUREMENT

[75] Inventors: Karl Adler, Grenchen; Georges Ducommun, Feldbrunnen; Charles A. Wantz, Grenchen, all of Switzerland

[73] Assignee: Biviator S.A., Grenchen, Switzerland

[22] Filed: Oct. 24, 1974

[21] Appl. No.: 517,760

Related U.S. Application Data

[63] Continuation of Ser. No. 375,007, June 29, 1973, abandoned.

[30] Foreign Application Priority Data

July 20, 1972 Switzerland........................ 10886/72

[52] U.S. Cl.................................. 310/6; 310/3 R; 310/21; 310/22; 58/23 D; 58/23 BA; 58/28 R; 58/28 A
[51] Int. Cl.².......................................... H02N 1/00
[58] Field of Search................. 310/3, 21, 22, 25, 5, 310/6; 58/23 R, 23 D, 23 B, 28 R, 29, 28 A, 28 B

[56] References Cited
UNITED STATES PATENTS

| | | | |
|---|---|---|---|
| 1,910,434 | 5/1933 | Hayes | 58/29 |
| 2,606,222 | 8/1952 | Clifford et al. | 58/23 D |
| 2,835,105 | 5/1958 | Favey | 58/28 A |
| 2,934,887 | 5/1960 | Keller | 58/28 R |
| 3,605,400 | 9/1971 | Emerson | 58/23 R |
| 3,609,957 | 10/1971 | Emerson et al. | 310/6 X |
| 3,641,373 | 2/1972 | Elkuch | 310/6 |
| 3,652,955 | 3/1972 | Cruger et al. | 310/25 X |

OTHER PUBLICATIONS

"Nuclear Batteries." Garrett, Jr. Chem. Ed., vol. 33, No. 9, 9/56, (pp. 446–449).

*Primary Examiner*—Donovan F. Duggan
*Attorney, Agent, or Firm*—Imirie, Smiley & Linn

[57] ABSTRACT

This invention concerns an oscillator for time measurement, comprising a resonator the oscillation of which is maintained by at least one part reciprocated by electrostatic forces relative to at least one electrode connected to a direct voltage source, said part being periodically charged by contact with the electrode, or electrodes comprising an elastically deformable contact making member whose elastic deformation energy is much less when in contact with an electrode than the motional energy of the resonator.

18 Claims, 9 Drawing Figures

OSCILLATOR FOR TIME MEASUREMENT

This is a continuation of application Ser. No. 375,007, filed June 29, 1973, now abandoned.

BACKGROUND OF THE INVENTION

The present invention concerns an oscillator for time measurement, the oscillator comprising a resonator the oscillation of which is excited by at least one member reciprocated by electrostatic forces derived from electrodes connected to a direct voltage source, the member being periodically charged by alternating contact with the electrodes. Such electrostatic drives are particularly suitable for direct connection to a direct source of high voltage such as an isotope battery with direct conversion.

Several oscillator drives based on an electrostatic principle are known which, however, are operated with alternating current. These are unsuitable for conversion of a high direct voltage into mechanical energy. There are electrostatic converters which produce a simple drive and can be operated with a single oscillating capacitor which works by a known charging and discharging process. However, these are not suitable for maintaining a mechanical oscillation. If, for example, a mechanical resonator is to be operated from a simple oscillating capacitor which operates only unilaterally in a discharge mode this resonator would receive one pulse only in one direction until the condenser plates are in contact with each other and discharge. The efficiency of such a system would consequently be very poor and the frequency of the mechanical resonator would have to be higher than the extremely short time constant of the charging time (or frequency) of the capacitor spring. This is not possible in practice.

The time-determining member in this case would be the capacitor spring. If it was desired to use a unilaterally acting oscillating capacitor for a mechanical resonator which receives a pulse at its zero point, this is not possible, because although the pulse would be possible to supply half an oscillation, the capacitor spring would be tensioned during its passage through the zero point for the second half-oscillation and the drive during further movement would be in the wrong direction. The same applies to cases in which the mechanical resonator touches a contact in passing through the zero point in order to supply the capacitor with current. In these cases a commutator (current-reversing) principle would have to be used, and this is not possible for zero point pulses in alternating form. The drive of a mechanical resonator according to the above known embodiments of oscillating capacitors is therefore not possible. Similarly, a drive of a mechanical resonator with conventional alternating self-discharging oscillating capacitors is impossible, since the rigid oscillating capacitor plates do not permit free oscillation of the mechanical resonator.

SUMMARY OF THE INVENTION

It is the object of the present invention to avoid the disadvantages of all the above-known arrangements.

According to the present invention there is provided an oscillator for time measurement, including a resonator the oscillation of which is maintained by at least one part reciprocated by electrostatic forces relative to at least one electrode connected to a direct voltage source, said part being periodically charged by contact with the electrode or electrodes, comprising an elastically deformable contact making member whose elastic deformation energy is much less when in contact with an electrode than the motional energy of the resonator.

In this manner, a simple system of high efficiency can be achieved which, as a result of practically undisturbed oscillation of the resonator, ensures a high degree of accuracy in operation. Disturbing impacts of the member displaceable between the electrodes against rigid electrodes are avoided. This fact is of special importance in supplying the oscillator from an isotope battery the output of which diminishes with time. As a result when a timepiece battery is in a new condition, the oscillation amplitude produced is greater than would be necessary for reliable contact making, so that such contact making is ensured when the amplitude drops somewhat.

The displaceable member which may be a spring, is preferably coupled with a resonator the motional (or potential) energy of which is much higher than the potential energy of the member itself. A resonator in the form of a balance wheel or a torsion oscillator of 50 Hz frequency is particularly suitable. Thus not only is a high ratio between the potential energy of the resonator and the energy of the resulting elastic deformation possible, but the amplitude of the resonator can be much greater than that of the displaceable member between the electrodes, so that the stepping of a train of wheels by the resonator is considerably facilitated relative to such stepping effected directly through a spring oscillating between the electrodes.

The present invention will now be described with reference to several embodiments which are illustrated in the accompanying drawings.

DETAILED DESCRIPTION OF THE INVENTION

Figure 1:
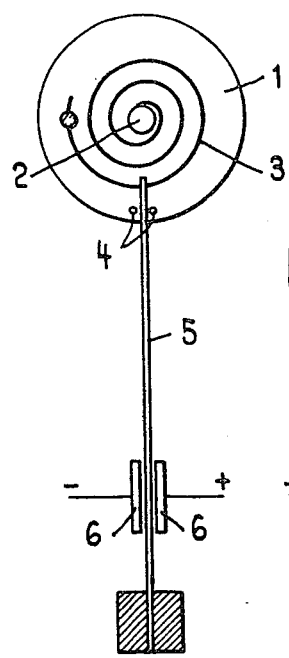
FIG. 1 is a diagrammatic view of a first embodiment of the present invention with a balance wheel which is coupled to a driving oscillator spring.

FIG. 1 shows a balance wheel 1 secured to a spindle 2. A hair spring 3 is secured at its inner end to the balance wheel spindle 2 and fixed at its outer end, its effective length being adjustable by a regulator (not shown). It should be understood that while the terms balance wheel and balance wheel assembly are used throughout the present disclosure, it is intended that these expressions encompass the more precise term "balance", i.e., any device which, by oscillating, regularizes the movement of the train of a watch or a clock.

The balance wheel 1 is provided with two pins 4, loosely enclosing the free end of a leaf spring 5. The other end of the leaf spring 5 is clamped, as shown in FIG. 1. Two plates are provided as electrodes 6, nearer to the clamped end of the leaf spring 5 than to the free end. The electrodes are directly connected to a voltage source of high internal resistance such as an isotope battery. The leaf spring 5 is insulated both at its clamp and also from the balance wheel 1. Thus pins 4 may be of insulating material such as sapphire.

When the balance wheel 1 is set into oscillation by external means the leaf spring 5 first touches one electrode 6 and is charged to its potential. It is then repelled by the contacted electrode and urged towards the other electrode. At the same time the spring 5 transmits energy to the balance wheel 1. Upon subsequent contact with the other electrode the spring 5 is charged oppositely and is urged in an opposite direction, when it again transmits energy to the returning balance wheel. The oscillation of the balance wheel 1 is built up in this manner. Since it is necessary for maintaining an oscillation that the spring 5 should sequentially touch both electrodes 6, the oscillation amplitude under normal operating conditions must be higher by a certain safety factor than the minimum necessary for fulfilling this condition. In addition, in the event of an isotope battery the voltage of which falls progressively, the oscillation amplitude must initially be sufficiently high such that towards the end of the battery life, i.e. approximately a half-life decay period of the radio-active material used in the battery, the oscillation amplitude is still sufficient to produce effective contact between the spring and the electrodes.

Figure 2:
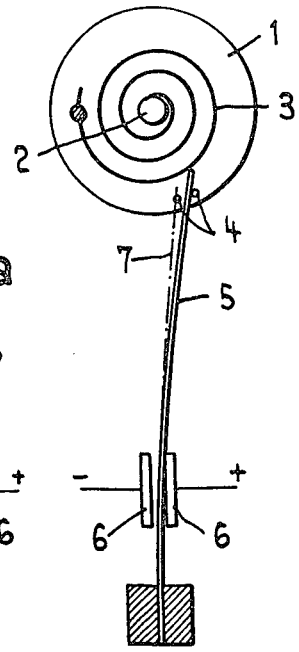
FIG. 2 is a view similar to FIG. 1 with the balance wheel and oscillating spring in an end position.

It is therefore clear that the device must be such that the balance wheel 1 continues to swing in a predetermined direction after the spring 5 has come into contact with the corresponding electrode 6. FIG. 2 shows the approximate conditions when the balance wheel is in an end position. The spring 5 is strongly bent and is supported against one electrode 6. The chain-dotted line 7 indicates the position and form of the spring 5 the moment after which it comes into contact with the right-hand electrode to detach itself therefrom. Therefore, during each half-period of the balance wheel, a certain elastic bending of the spring 5 takes place. However, the deformation energy and force are so weak that the oscillation of the balance wheel can be regarded as practically free oscillation. In particular, the energy necessary to bend the spring 5 is much less than the potential energy of the balance wheel assembly i.e., the energy in the tensioned hair spring 3 or the maximum kinetic energy of the balance wheel 1 as it passes through a zero position at maximum speed. The maximum deformation force in the spring 5 should be approximately equal to the electric potential energising force, and the maximum deformation or stored energy should be of the same order of magnitude as the driving energy per half-oscillation. Under these conditions reliable regulation can be achieved with very simple means, because the balance wheel swings substantially freely and thus its frequency is substantially independent of amplitude fluctuations. If, on the other hand, the electrostatic driving system were rigidly coupled with the resonator, the oscillation thereof would be greatly influenced and the frequency would then be dependent on the speed with which the driving part would pass through the gap between the two electrodes.

Figure 3:
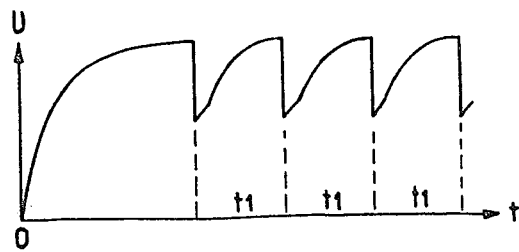
FIGS. 3 and 4 are graph which show the voltage on the electrodes at different oscillating amplitudes of the balance wheel arrangement of FIG. 1.
Figure 4:
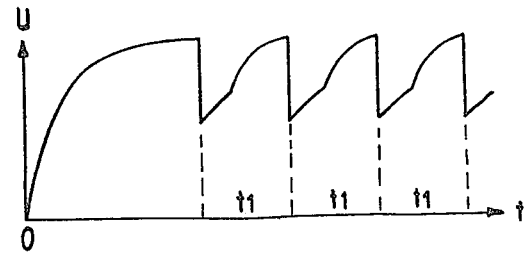

Reference to FIGS. 3 and 4 shows that there can be no instability in the sense that, with a comparatively high amplitude during which the spring 5 remains on one electrode 6 for a comparatively long time, a higher charge could result and thus the amplitude could become increasingly uncontrollable. These figures show the characteristics of the voltage on the electrodes 6. The charging of the capacitor formed by the electrodes begins at the switch-on time 0 and its rate is proportional to the yield of the voltage source. Charging occurs substantially up to a maximum voltage. Upon contact with an electrode by the spring 5, a drop in voltage occurs due to the sudden charging or recharging of the spring. As long as the spring 5 is in contact with an electrode, the capacity of the system is increased and a reduced rate of rise in the voltage follows. If the spring 5 is then moved from the electrode, the capacity of the system is reduced and the voltage on the electrode increases more rapidly. FIGS. 3 and 4, which show respectively the conditions in the case of a small and a large amplitude, demonstrate that the spring receives more charge the longer it is in contact with an electrode. But the higher the charge applied by one electrode to the spring, the more the opposite electrode is discharged on change-over. Since the frequency of the balance wheel 1 is constant, a higher charge is applied to the spring the higher the voltage between the electrodes 6 rises; this is also accompanied by an increased amplitude of the balance wheel. Therefore a natural regulating process exists which prevents any great rise in the charge on the electrodes 6, and which is assisted by the increased losses due to the greater bending of the spring 5, a stronger friction between the pins 4 and the spring 5, and increased frictional losses of the balance wheel itself at the higher amplitude. Calculations have shown that the balance wheel amplitude is only 3% greater when an isotope battery is new than the amplitude at the end of the half-life period when the battery voltage has dropped to one-half its initial value and the driving energy thereof to one quarter.

The device shown can be used in a wrist-watch or pocket-watch. The balance wheel oscillates preferably at a frequency of 50 Hz and an amplitude of about 15°. This amplitude and frequency of the balance wheel enables a train of gear wheels to be easily driven. In addition, as already mentioned, high accuracy of time-keeping is achieved if the balance wheel has a Q factor of at least 425. The amount of space required for the balance wheel and its driving system is small.

The following electrical output can be derived from a tritium cell with an activity of 300 mCi:

Electron emission $1.3 \times 10^{10}$

Current $2 \times 10^{-9}$ amp

EMF $1.2 \times 10^2$ volts

This gives an output of $2.4 \times 10^{-7}$ watt or 0.24 $\mu$W.

From trials it has been found that the output necessary for operating a mechanical movement must be at least 0.01 $\mu$W. Therefore an adequate power output reserve is available, even if not maximum efficiency is stipulated. If desired, the movement may be driven by a weaker cell.

Figure 1A:
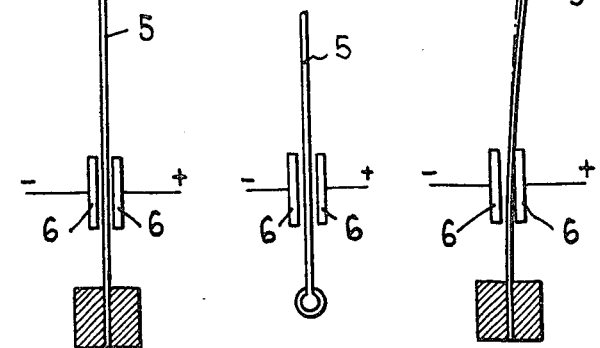
FIG. 1a is a diagrammatic view of a variation of FIG. 1.

The embodiment shown in FIGS. 1 and 2 may be modified in various ways. For example, one end of the spring need not be clamped but, as shown in FIG. 1a, may be mounted on a pivot. The coupling between the spring 5 and the balance wheel 1 may be effected by providing the balance wheel 1 with only one pin 4 around which a fork of the spring 5 engages.

Figure 5:
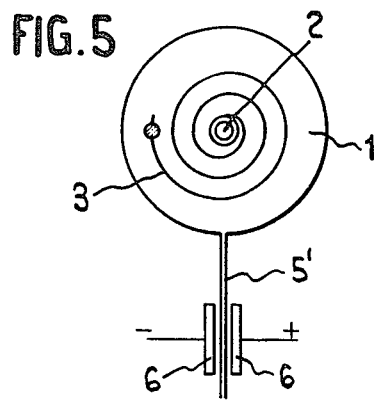
FIG. 5 is a diagrammatic view of a second embodiment with an oscillating spring secured to a balance wheel.

FIG. 5 shows an embodiment which differs from that of FIGS. 1 and 2 by the feature that the driving spring 5' is fixed to the balance wheel 1. Parts in FIG. 5 corresponding to similar parts in FIGS. 1 and 2 are similarly numbered. When the balance wheel is oscillating, the spring 5' bends each time after coming into contact with one of the electrodes 6 and consequently enables the balance wheel 1 to oscillate, its motional energy being higher than the deformaton energy of the spring 5'. The spring 5' is insulated from the balance wheel unless the balance wheel itself consists of non-conductive material or is insulated.

Figure 6:
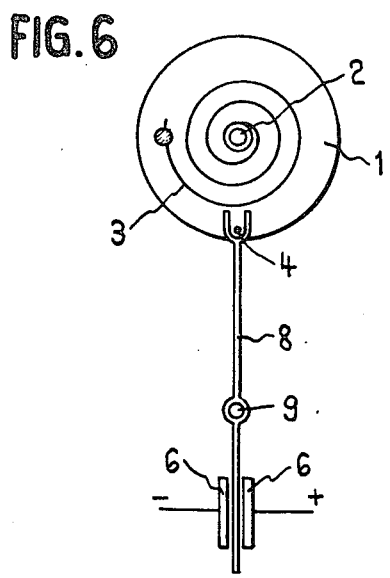
FIG. 6 is a diagrammatic view of another embodiment comprising a fork-ended driving lever.

FIG. 6 shows another variation in which corresponding parts are again provided with the same reference numerals as in the preceding figures. In this case the balance wheel 1 is provided with a pin 4 which engages in a fork on one end of a driving lever 8. The lever 8 is pivotable about a spindle 9. Its end away from the fork is disposed between the electrodes 6. One or both arms of the lever 8 are resilient. When the balance wheel 1 is oscillating, the lower arm of the lever 8 located between the electrodes 6 strikes alternately against one or other of the electrodes 6, whereupon one or both arms of the lever 8 bend. Once again the deformation energy of the lever is arranged to be much less than the motional energy of the balance wheel.

Figure 7:
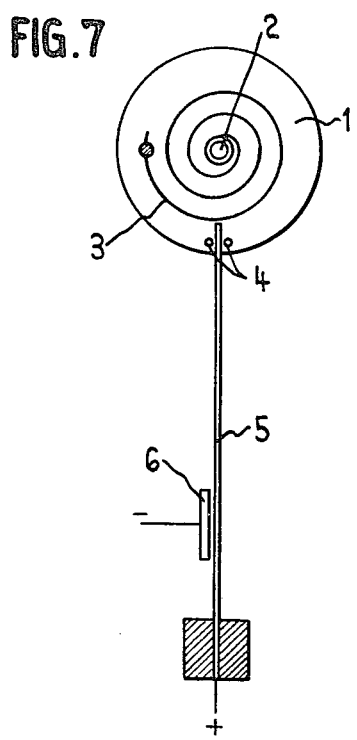
FIG. 7 is a diagrammatic view of a further embodiment with a unilaterally acting driving system.

FIG. 7 shows an embodiment corresponding to that of FIGS. 1 and 2, but with only one electrode 6. Similar parts have the same reference numerals as in FIG. 1. In this case the spring 5 is directly connected to one pole of the battery. When the spring 5 comes into contact with the electrode 6, the battery is short-circuited. Therefore no electrostatic forces exist as long as the spring 5 is in contact with the electrode 6. When the spring 5 is moved by the oscillation of the balance wheel 1 away from the electrode 6, charging of the capacitor formed by the spring 5 and the electrode 6 begins. During the half-oscillation of the balance wheel in an anti-clockwise direction, the voltage between the electrode 6 and the spring 5 is still low so that the electrostatic force retarding the oscillation is correspondingly weak. During the subsequent return swing in clockwise direction, however, the voltage between the spring and the electrode 6 is much higher so that a driving force stronger than the retarding force is operative.

In all the embodiments, resilient electrodes may be provided instead of the rigid electrodes 6 shown, these resilient electrodes co-operating with substantially rigid parts. It is essential in each case that the resonant frequency of the resilient contacts should be much higher than that of the frequency-determining resonator, and/or that the resilient contacts should be so strongly damped that their own oscillation does not in practice have any influence on the making of contact.

Other resonant systems than those described and illustrated may be used. Instead of a balance wheel with a spiral spring, a torsion pendulum may be provided. Instead of an elastic return force, a magnetic return force may be used in the form of a moving magnet which co-operates with a fixed magnet, the moving magnet being on the balance wheel.

In the embodiments shown in FIGS. 1, 5 and 6, difficulties may occur because the spring 5 or 5' short-circuits the two electrodes 6 as a result of bending causing an inclined position of the spring when the balance wheel is in an end position.

Figure 8:
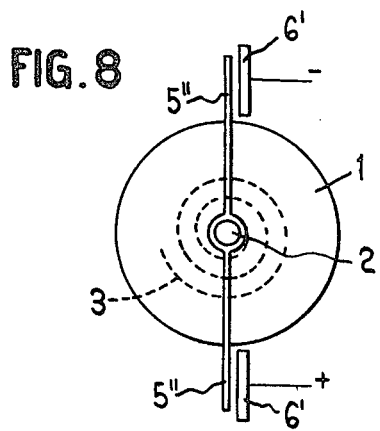
FIG. 8 is a diagrammatic view of a further alternative embodiment.

This difficulty may be avoided in the embodiment shown in FIG. 8 by providing springs 5'' projecting radially oppositely from the balance wheel 1 or balance wheel staff 2, the springs co-operating with respective electrodes 6'. The two springs 5'' are electrically connected and electrodes 6' connected to the voltage source. Upon contact of one spring 5' with one of the electrodes 6', both springs 5'' are charged to the potential of the contacted electrode 6', whereupon a torsion acts on both springs 5'' effecting a rotation until the other spring 5'' comes into contact with the other electrode 6'. Thus oscillation of the balance wheel is maintained.

What we claim is:

1. An oscillator for time measurement, comprising a source of direct current operating potential; an electrostatic oscillator including at least one fixed electrode connected to said source, and a movable driving member disposed adjacent said fixed electrode and periodically contacting said fixed electrode for reciprocal, oscillatory movement under electrostatic forces generated by such periodic contact; resonator means in the form of a balance wheel assembly having a natural resonant frequency; and means loosely coupling said electrostatic driving member to said balance wheel assembly for sustaining osciallation of said resonator means without substantially disturbing the natural frequency accuracy thereof.

2. An oscillator according to claim 1, wherein said movable member is a spring.

3. An oscillator according to claim 1, wherein said source is an isotope battery.

4. An oscillator according to claim 2, wherein said spring is disposed radially relative to the axis of said balance wheel.

5. An oscillator according to claim 2, wherein said spring is connected to said balance wheel shaft.

6. An oscillator according to claim 1, wherein said balance wheel is constructed as a torsion vibrator.

7. An oscillator according to claim 1, wherein said movable member is elastically deformable.

8. An oscillator according to claim 2, wherein the natural frequency of said spring is much higher than that of said balance wheel.

9. An oscillator according to claim 1, wherein said movable member is a lever having at least one resilient arm.

10. An oscillator according to claim 2, wherein said spring is clamped at one end and is coupled to said balance wheel at its free end.

11. An oscillator according to claim 3, wherein said isotope battery is a tritium cell.

12. An oscillator according to claim 4, wherein said spring and said balance wheel are made of one piece.

13. An oscillator according to claim 10, wherein the clamping point of said spring is nearer to said fixed electrode than it is to the coupling point of said spring and said balance wheel.

14. An oscillator according to claim 1, wherein said balance wheel has a magnetic restoring force.

15. An oscillator according to claim 1, wherein two fixed electrodes are connected to opposite poles of said source.

16. An oscillator according to claim 15, wherein said two fixed electrodes are disposed on opposite sides of said movable member.

17. An oscillator according to claim 15, wherein said two fixed electrodes are both disposed on one side of said movable member.

18. An oscillator according to claim 1, wherein said movable member is pivotally reciprocable.

* * * * *